United States Patent
Knautz et al.

[19]

[11] Patent Number: 6,070,891
[45] Date of Patent: Jun. 6, 2000

[54] RACK EXTENSION DEVICE FOR RACK AND PINION SYSTEM

[75] Inventors: Jeffrey P. Knautz, Centreville; Barry Alan Parker; Brandon J. Tuckey, both of Quincy, all of Mich.

[73] Assignee: DFM Corporation, Indianola, Iowa

[21] Appl. No.: 08/963,048

[22] Filed: Nov. 3, 1997

[51] Int. Cl.[7] .................................................... B62D 3/12
[52] U.S. Cl. ............................... 280/93.514; 280/93.503; 280/93.515
[58] Field of Search .................... 280/93.502, 93.503, 280/93.51, 93.513, 93.514, 93.515, 771; 180/400

[56] References Cited

U.S. PATENT DOCUMENTS

| | | | |
|---|---|---|---|
| 1,926,174 | 9/1933 | Reilly et al. | 74/110 |
| 2,219,645 | 10/1940 | Bartho et al. | 180/79.2 |
| 2,894,525 | 7/1959 | Erickson | 137/108 |
| 3,605,933 | 9/1971 | Millard | 180/79.2 R |
| 3,633,933 | 1/1972 | Millard | 280/93.514 |
| 3,944,015 | 3/1976 | Bishop | 180/79.2 R |
| 4,144,948 | 3/1979 | Sergay | 180/148 |
| 4,146,244 | 3/1979 | Presley | 280/96 |
| 4,172,507 | 10/1979 | Millard | 180/148 |
| 4,630,701 | 12/1986 | Venetjoki | 180/209 |
| 4,685,690 | 8/1987 | Fujita et al. | 280/124.103 |
| 5,851,015 | 12/1998 | Klosterhaus | 280/93.51 |

*Primary Examiner*—Paul N. Dickson
*Assistant Examiner*—David R. Dunn
*Attorney, Agent, or Firm*—Zarley, McKee, Thomte, Voorhees & Sease

[57] ABSTRACT

A rack extension device for use with an existing rack and pinion steering system and a suspension lift system. The rack extension device includes a second rack disposed beneath the original rack and adapted to receive the tie rods of the rack and pinion steering system so that the tie rods maintain their original geometry when the original rack is elevated. The present invention also includes a method for adapting a rack and pinion steering system having an original rack and tie rods for use with a suspension lift system. The method includes the steps of providing a second rack adapted to receive the tie rods, and mounting the second rack below the original rack so that the tie rods maintain their original geometry when the original rack is elevated by the suspension lift system.

15 Claims, 2 Drawing Sheets

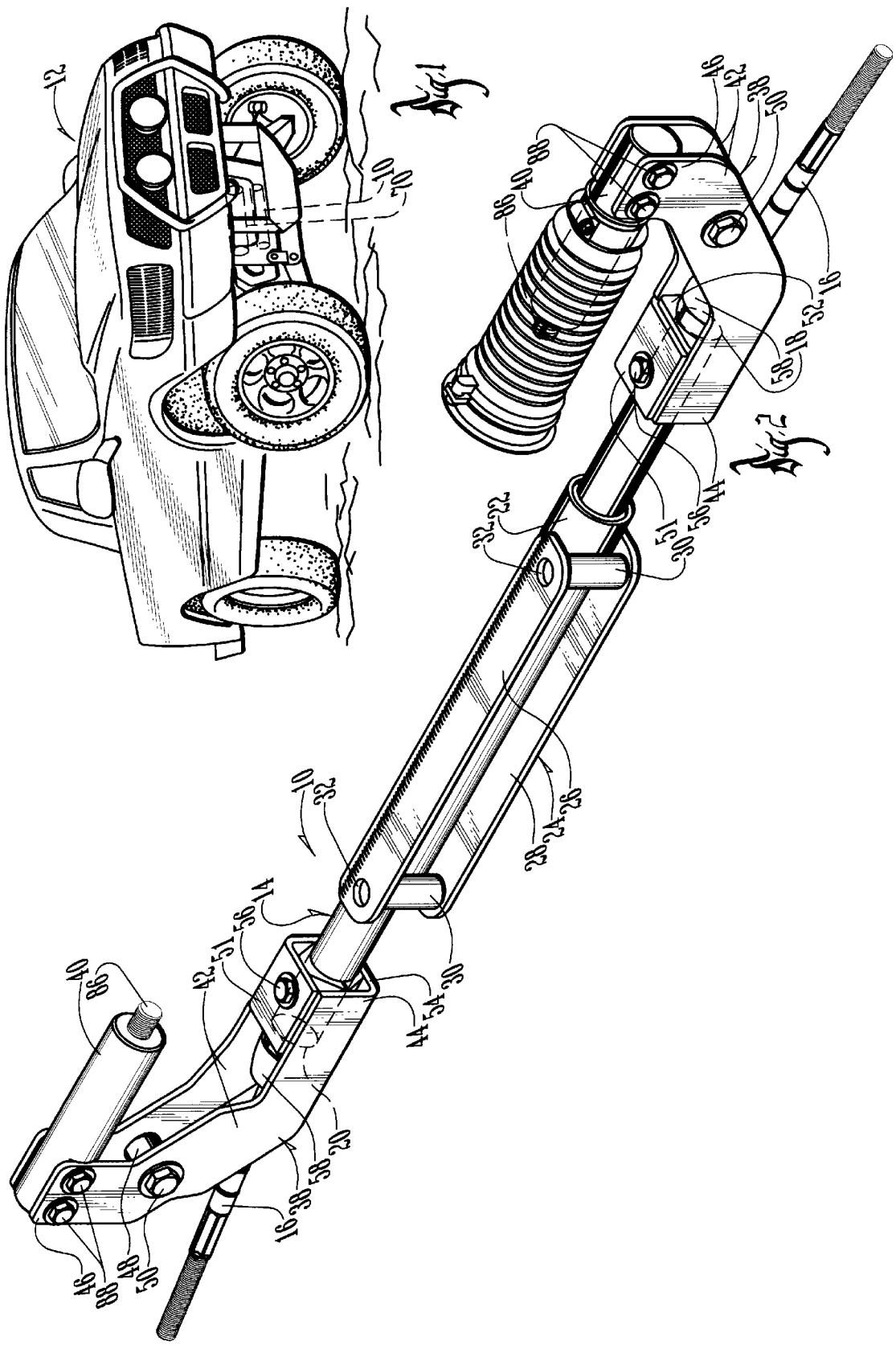

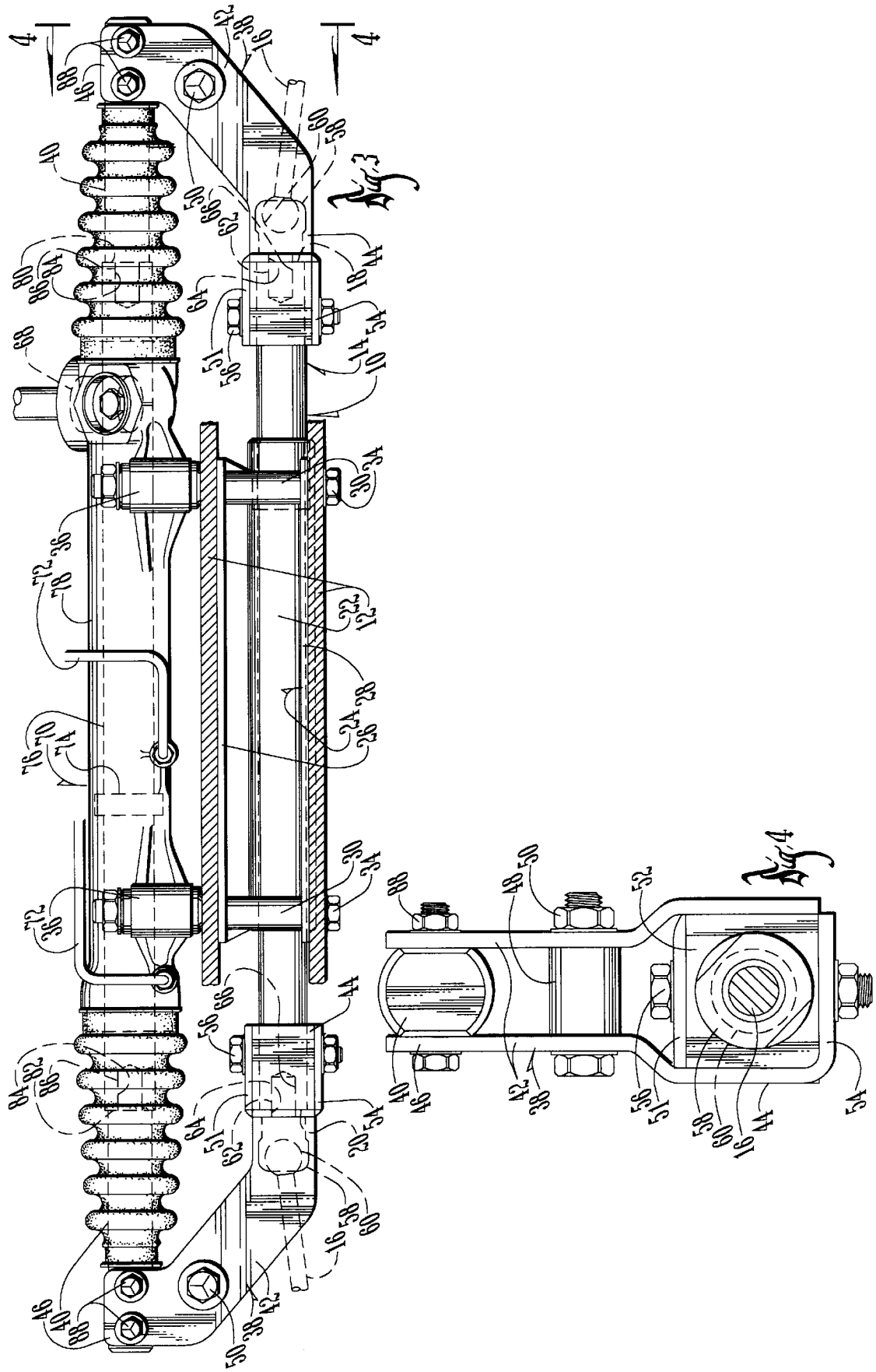

6,070,891

RACK EXTENSION DEVICE FOR RACK AND PINION SYSTEM

FIELD OF THE INVENTION

The present invention pertains to the field of rack and pinion steering systems and, in particular, a rack extension device for use with a rack and pinion system and a suspension lift system.

BACKGROUND OF THE INVENTION

It is common today for a car or truck owner to purchase an after-market suspension lift system. The suspension lift system must be adapted to work with the original rack and pinion steering system to cause the frame of the vehicle to ride higher above the ground. It is important that the suspension lift system be installed such that when the frame of the vehicle is elevated above the ground, the original factory steering geometry is retained. This often requires dropping the entire original rack with extensive bracketry and using steering extensions to maintain the original geometry, a labor intensive and costly process. Further, the structure necessary to accomplish the "drop" varies from one vehicle model to another. Thus, there is a need in the art for a rack extension device that obviates the need for excessive bracketry, steering extensions, and other modifications.

It can therefore be seen that there is a real and continuing need for the provision of a new rack extension device for use with a rack and pinion steering system and a suspension lift system.

Accordingly, the primary objective of the present invention is the provision of a rack extension device that eliminates the need for excessive bracketry, steering extensions, and custom modifications to the existing rack and pinion steering system.

Another objective of the present invention is the provision of a rack extension device that is easy to install, efficient in operation, and economical to manufacture.

Still another objective of the present invention is the provision of a method for adapting an original rack and pinion steering system that ensures that the components of the steering system maintain their original geometry.

SUMMARY OF THE INVENTION

The foregoing objectives are achieved by the provision of a rack extension device having a second rack disposed beneath the original rack and adapted to receive the tie rods of the rack and pinion steering system so that the tie rods maintain their original geometry when the original rack is elevated. Also provided is a means for connecting the original rack and the second rack such that the second rack moves in direct response to the original rack.

Providing a second rack to an existing rack and pinion system accomplishes two important objectives. First, the use of a second rack obviates the need to drop the original rack with extensive bracketry and rework involved. Second, attaching the tie rods of the rack and pinion system to the second rack, and not the original rack, allows the tie rods to maintain their correct geometry.

In its preferred form, the means for connecting the original rack and the second rack includes rack transfer brackets that couple the ends of the racks together. The rack extension device may also include a hollow shaft guide enclosing at least a portion of the second rack and adapted to be rigidly attached to the original rack. The second rack is allowed to slide inside the shaft guide, with the shaft guide providing additional support for the rack extension device and also ensuring that the original rack and second rack maintain a generally spaced-apart and parallel relationship.

The present invention also includes a method of adapting a rack and pinion steering system having an original rack and tie rods for use with a suspension lift system. The method generally comprises the steps of providing a second rack adapted to receive the tie rods, and mounting the second rack below the original rack so that the tie rods maintain their original geometry when the original rack is elevated by the suspension lift system.

BRIEF DESCRIPTION OF THE DRAWINGS

FIG. 1 is a perspective view of a truck used with the rack extension device of the present invention.

FIGS. 2 is a perspective view of the rack extension device of the present invention.

FIG. 3 is a side elevational view of the rack extension device of FIG. 2 as attached to an existing rack and pinion steering system.

FIG. 4 is a side elevational view taken along line 4—4 of FIG. 3.

DETAILED DESCRIPTION OF THE PREFERRED EMBODIMENT

FIG. 1 shows generally the rack extension device 10 of the present invention as used with a truck 12. It should be understood that the rack extension device 10 is not limited to trucks, but may be used with cars and other vehicles having a rack and pinion steering system.

FIGS. 2 and 3 shows the rack extension device 10 in greater detail. The rack extension device 10 includes a second rack 14 adapted to attach to the tie rods 16 of the existing rack and pinion steering system. The second rack 14 is an elongated circular cylinder having a right end 18 and a left end 20 (see FIG. 3).

The second rack 14 may be inserted through a hollow elongated shaft guide 22, which in turn is welded to a mounting bracket 24 suitable for mounting to the original rack. The mounting bracket 24 includes a top wall 26 and a bottom wall 28. The shaft guide 22 is welded to the bottom wall 28. Interconnecting hollow shafts 30 are aligned with apertures 32 in the top and bottom walls 26 and 28. To secure the shaft guide in place, bolts 34 are inserted through the interconnecting shafts 30 and mounting shafts 36 in the housing 78 of the original rack 70.

The outside diameter of the second rack 14 and the inside diameter of the shaft guide 22 are sized to permit the second rack 14 to slide in a generally horizontal direction inside the shaft guide 22 (see FIG. 3). In addition to providing additional support for the rack extension device 10, the shaft guide 22 and mounting bracket 24 also help to ensure that the second rack 14 and original rack maintain a spaced apart and substantially parallel relationship.

The rack extension device 10 also includes a means for connecting the original rack and the second rack 14 so that the second rack moves in direct response to the original rack. In its preferred form, a pair of rack transfer brackets 38 and rack extension rods 40 are used to effect a rigid connection between the original rack and the second rack 14. Each of the rack transfer brackets 38 has a pair of opposing side walls 42 that extend between a first end 44 and a second end 46. One of the side walls 42 includes an inner connecting channel 48 for receiving a screw 50 to maintain the side walls 42 in a uniform spaced-apart relationship. One of the side walls 42 also includes a top wall 51 and adjacent side wall 52 towards the first end 44 of the rack transfer bracket 38. The other of the side walls 42 includes a bottom wall 54 opposite said top wall 51. The top wall 51, side wall 52 and bottom wall 54 also help to ensure a uniform and spaced apart relationship between the side walls 42. In addition, the top wall 51 and bottom wall 54 include apertures for receiving a bolt 56.

The top and bottom walls 51 and 54 provide a mounting surface for attaching the rack transfer bracket to either the right end 18 or left end 20 of the second rack 14. The side wall 52 provides a mounting surface for the tie rods 16. A ball and socket joint is formed by a socket 58 and a ball 60 at the end of the tie rod 16. The socket 58 includes a threaded extension 62 that is inserted through an aperture 64 in the side wall 52 and into a threaded aperture 66 in either the right end 18 or left end 20 of the second rack 14. In an alternate embodiment, the original rack could be connected to something other than the second rack. For example, the original rack could be connected to a cross-member.

The existing rack and pinion steering system and its attachment to the second rack 14 will now be described in detail. It should be understood that rack and pinion systems are old in the art and may include many modifications not shown herein. Typically, the rack and pinion system includes a pinion 68 that is operatively engaged with the original rack 70 causing the rack 70 to move in a substantially horizontal direction in response to a rotation of the pinion 68. Power steering systems often include hydraulic inlets 72, a cylinder sleeve 74 and rod 76 extending beyond the housing 78 of the rack 70. The cylinder sleeve 74 operates as a seal inside the rack to enable a differential in pressure on the right or left side of the rack 70, thereby causing the rod 76 to shift right or left.

Similar to the second rack 14, the original rack 70 also includes a right end 80 and a left end 82. Both ends of the original rack 70 include a threaded bore or aperture 84 for receiving a tie rod. However, when used with the rack extension device 10 of the present invention, a rack extension rod 40 with a threaded extension 86 is screwed into the ends of the original rack 70. The rack extension rod 40 is in turn attached to the second end 46 of the rack transfer bracket 38 by means of two mounting bolts 88. It can therefore be appreciated that the rack extension device 10 moves in direct response to the original rack 70. Further, with the original rack 70 and second rack 14 positioned in a spaced apart and parallel relationship, the existing tie rods, when attached to the ends of the second rack 14 retain their original geometry. This eliminates the need for excessive bracketry and modification of other components to effect a drop in the original rack 70. It can also be appreciated that the vertical measurement between the first end 44 and the second end 46 of the rack transfer bracket 38 can be modified to offset the elevation produced by the suspension lift system.

It is preferred that all components of the rack extension device 10 be made from a ASTM A-36 steel.

The rack extension device 10 as described above may be used to easily adapt a rack and pinion steering system having an original rack 70 and tie rods 16 for use with suspension lift systems. The preferred method generally includes mounting the second rack 14 below the original rack 70 so that the tie rods 16 maintain their original geometry when the original rack is elevated by the suspension lift system. This requires that the vertical distance between the ends of the second rack 14 and original rack 70 be substantially identical to the change in elevation caused by the suspension lift system.

It is preferred that the second rack 14 be inserted through the shaft guide 22. Next, the first ends 44 of the rack transfer brackets 38 are secured to the right and left ends 10 and 20 of the second rack 14 and the rack extension rods 40 are screwed into the right and left ends 80 and 82 of the original rack 70. Finally, the mounting bracket 24 is secured to the housing 78 of the original rack 70.

In an alternative embodiment, the device 10 of the present invention could be used with a vehicle that has been lowered rather than lifted. With such an embodiment, the second rack would be positioned above the original rack rather than below.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A rack extension device for use with a suspension lift system in retrofitting an original rack and pinion steering system having an original rack and tie rods directly connected to said original rack, said rack extension device comprising:

a second rack positionable beneath said original rack and adapted to receive said tie rods so that said tie rods maintain their original geometry when said original rack is elevated by said suspension lift system; and at least one rack transfer bracket for connecting said original rack and said second rack so that said second rack moves in direct response to said original rack.

2. The rack extension device of claim 1 wherein said original rack and said second rack are rigidly connected.

3. The rack extension device of claim 1 wherein said second rack has a right end and a left end opposite said right end, said right and left ends are adapted to receive said tie rods.

4. The rack extension device of claim 3 wherein said original rack and said second rack are elongated and maintain a substantially parallel relation.

5. The rack extension device of claim 4 wherein said original rack has a right end and a left end opposite said right end, said right and left ends of said original rack are generally aligned with said right and left ends of said second rack respectively.

6. The rack extension device of claim 5 wherein said rack transfer bracket has a first end attached to one of said right and left ends of said second racks, and a second end operably connected to one of said right and left ends of said original rack.

7. The rack extension device of claim 6 further comprising an extension rod interconnecting said original rack and said second end of said rack transfer bracket.

8. The rack extension device of claim 1 further comprising a hollow shaft guide enclosing at least a portion of said second rack and adapted to be rigidly attached to said original rack so that said second rack is allowed to slide inside said shaft guide.

9. A method of retrofitting an original rack and pinion steering system for use with a suspension lift system, said original rack and pinion steering system having an original rack and tie rods directly connected thereto, said method comprising:

providing a second rack adapted to receive said tie rods; and mounting said second rack below said original rack so that said tie rods maintain their original geometry when said original rack is elevated by said suspension lift system.

10. The method of claim 9 wherein said second rack is rigidly mounted to said original rack so that said second rack moves in direct response to said original rack.

11. The method of claim 9 wherein said second rack is mounted to said original rack using a rack transfer bracket.

12. The method of claim 9 wherein said original and second racks are of substantially equal length and arranged in a generally spaced apart and parallel relation.

13. A method of adapting an original rack and pinion steering system for use with a suspension lift system, said original rack and pinion steering system having an original rack and tie rods directly connected thereto, said method connecting:

providing a hollow shaft guide;

mounting said shaft guide to said original rack;

providing a second rack adapted to receive said tie rods;

inserting said second rack into said shaft guide; and operatively connecting said original rack and said second rack.

14. The method of claim 13 wherein said shaft guide and said second rack are positioned so that said original rack and said second rack are spaced apart in a substantially parallel relation.

15. A rack extension device for use with a suspension lowering system in retrofitting an original rack and pinion steering system having an original rack and tie rods directly connected to said original rack, said rack extension device comprising:

a second rack positionable above said original rack and adapted to receive said tie rods so that said tie rods maintain their original geometry when said original rack is lowered by said suspension lowering system; and at least one rack transfer bracket for connecting said original rack and said second rack so that said second rack moves in direct response to said original rack.

* * * * *